United States Patent [19]

Hsieh

[11] Patent Number: 5,845,092
[45] Date of Patent: *Dec. 1, 1998

[54] ENDPOINT DETECTION IN A STAND-ALONE REAL-TIME VOICE RECOGNITION SYSTEM

[75] Inventor: Chau-Kai Hsieh, Hsinchu, Taiwan

[73] Assignee: Industrial Technology Research Institute, Hsinchu, Taiwan

[*] Notice: The terminal 9 months of this patent has been disclaimed.

[21] Appl. No.: 422,765

[22] Filed: Apr. 14, 1995

Related U.S. Application Data

[63] Continuation-in-part of Ser. No. 939,665, Sep. 3, 1992, abandoned.

[51] Int. Cl.⁶ ................................................. G10L 5/06
[52] U.S. Cl. .......................................................... 395/257
[58] Field of Search .............................. 395/2.09, 2.1, 395/2.14, 2.17, 2.19, 2.2, 2.23, 2.24, 2.35, 2.36, 2.4, 2.42, 2.45, 2.5, 2.52, 2.53, 2.55, 2.64

[56] References Cited

U.S. PATENT DOCUMENTS

| | | | |
|---|---|---|---|
| 4,509,187 | 4/1985 | Ackland et al. | 395/2.5 |
| 4,712,242 | 12/1987 | Rajasekaran et al. | 395/2.5 |
| 4,751,737 | 6/1988 | Gerson et al. | 395/2.5 |
| 4,821,325 | 4/1989 | Martin et al. | 395/2.62 |
| 4,882,756 | 11/1989 | Watari | 395/2.5 |
| 4,918,733 | 4/1990 | Daugherty | 395/2.5 |
| 4,956,865 | 9/1990 | Lenning et al. | 395/2.5 |
| 5,073,939 | 12/1991 | Vensko et al. | 395/2.5 |
| 5,309,547 | 5/1994 | Niyada et al. | 395/2.5 |
| 5,327,521 | 7/1994 | Savk et al. | 395/2.12 |

OTHER PUBLICATIONS

H. Sakoe, S. Chiba, "Dynamic Programming Algorithm Optimization for Spoken Word Recognition," *IEEE Trawn on Acoustics, Speech, and Signal Processing*, vol. ASSP–26, No. 1, Feb. 1978, pp. 43–49.

Y.–.C. Liu, G.A. Gibson, *Microcomputer Systems: The 8086/8088 Family*, Prentice Hall, Englewood Cliffs, NJ, 1986, pp. 349–352, 374–377, 424–427.

C.S. Meyers, et al., "A Comparative Study of Several Dynamic Time–Warping–Algorithms for Connected–Word Recognition," *The Bell System Technical Journal*, Sep. 1981, 60(7):1389–1407.

*Primary Examiner*—Allen R. MacDonald
*Assistant Examiner*—Robert C. Mattson
*Attorney, Agent, or Firm*—H. C. Lin Patent Agent

[57] ABSTRACT

A stand-alone, real-time voice recognition system, which converts an analog voice signal into serial digital signal, then preprocesses in parallel the digital signal to detect the end-point, and output fixed multi-order prediction coefficients. In this recognition system, these multi-order prediction coefficients are stored as the reference pattern in the training mode. In recognition mode, these multi-order prediction coefficients are adapted by dynamic time warping method, which is modified by a symmetric form. This symmetric form is implemented with a one-dimensional circular buffer for dynamic programming matching instead of the traditional two-dimensional buffer to save memory space. Finally, these adapted coefficients are compared with reference pattern to output the result of recognition.

3 Claims, 12 Drawing Sheets

ENDPOINT DETECTION IN A STAND-ALONE REAL-TIME VOICE RECOGNITION SYSTEM

This application is a continuation-in-part of application Ser. No. 07/939,665, filed Sept. 3, 1992, now abandoned.

FIELD OF INVENTION

This invention related to a real-time voice recognition system comprising microphone, amplifier, analog-to-digital converter and digital signal processor.

BACKGROUND

Speech recognition is the process by which speech is acoustically analyzed and the feature are extracted and transformed into language symbol representations. The recognition decision is made by evaluating similarity by a comparison of the input pattern of features with prestored reference after acoustical analysis. The process of extracting the reference patterns for a speaker is called training or learning of reference of patterns.

In acoustical analysis, it has been found that that there is a high correlation between adjacent samples of waveforms. With this understanding, a sampled value of a speech waveform is predictable by the weighted sum of a number of samples in the past, each of which is multiplied by a contant. These constants are known as linear predictive coefficients, and the method for seeking them is called linear predictive analysis.

In practical recognition, the speaking speed of different speakers may be different. Time compression is commonly used in the art to reduce the effect of variation for individual speakers. Timing differences between two speech patterns are eliminated by warping the time axis of one so that the maximum coincidence is attained with the other. This time compression technique is known as time-warping. This process is efficiently carried out by the use of dynamic time-warping (DTW) technique. Linear Prediction Coding (LPC) and DTW are usually used in voice recognition system as the method of coefficients extraction and efficient matching. Sakoaki and Chiba proposed two dynamic programming algorithms for DTW, a symmetric form and an asymmetric form, and found that the symmetric form is more accurate. However, their method needs a two-dimensional buffer to keep minimum distance for dynamic programming (DP) matching, requiring complicated computation and large memory capacity. In order to realize real-time processing, a complicated digital signal processor (DSP) is needed and another processor, such as PC/AT, is attached. Thus, the cost of such implementation is very high.

SUMMARY

An object of this invention is to implement a real-time voice-recognition system, which does not require complicated computation. Another object of this invention is to implement a real-time voice recognition system which does not require excessive memory size.

These objects are achieved by a simple signal processor, which is independent of another processor. The invention makes use of the corrected linear prediction code (LPC) and the dynamic time warping (DTW) method which is modified in symmetry form. In this modified symmetry form, a one-dimension circular buffer is used to save memory space. The recognition system is user dependent, using two steps of processing, namely: the training mode and the recognition mode.

BRIEF DESCRIPTION OF THE DRAWINGS

FIGS. 11($a$) and 11($b$) show the flow-chart of the operation for end-point detection.

DETAILED DESCRIPTION OF THE PREFERRED EMBODIMENT

Figure 1:
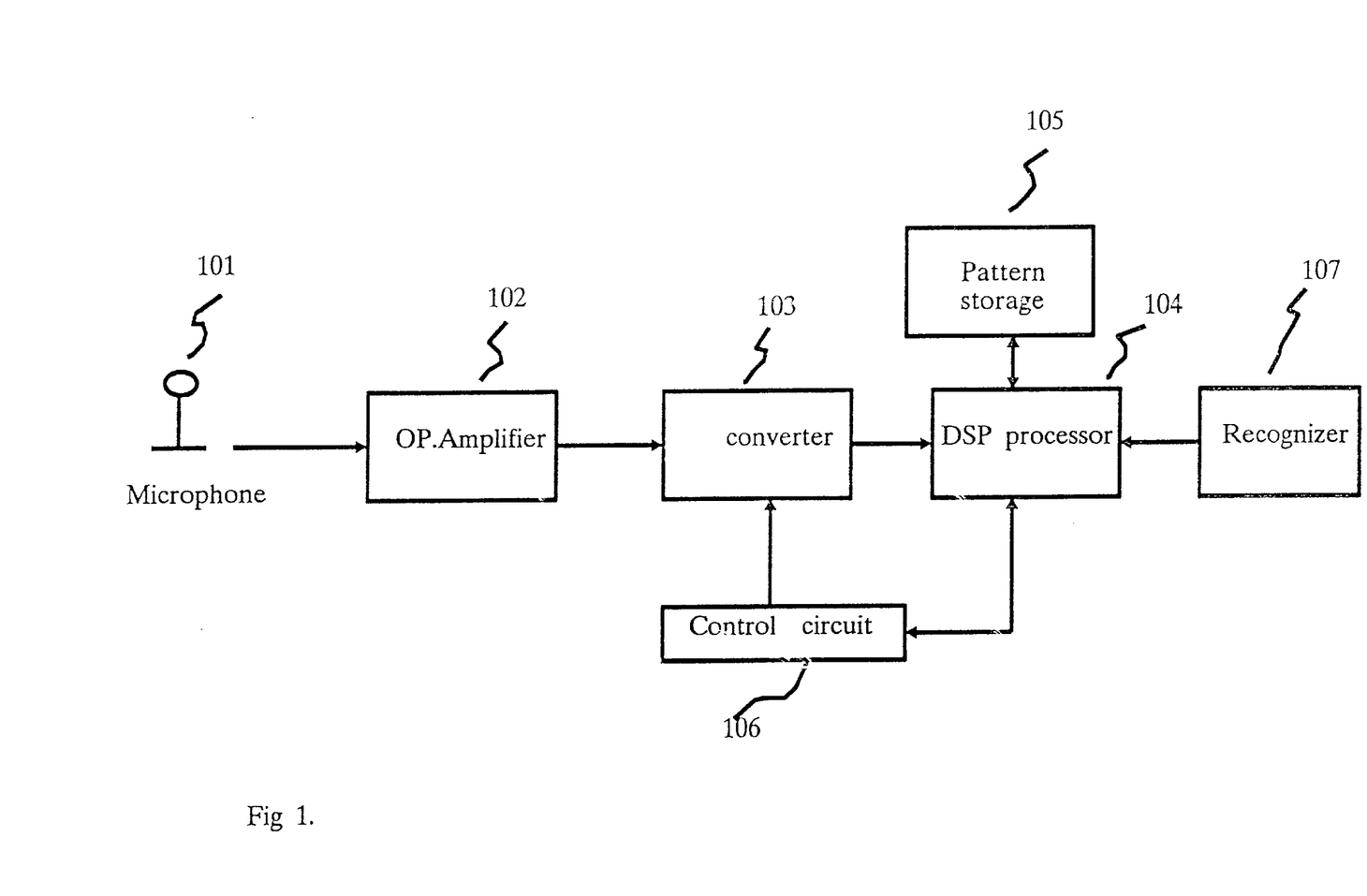
FIG. 1 illustrates the block diagram of the stand-alone, real-time voice recognition system based on this invention.

The block diagram of this invention is illustrated in FIG. 1. The microphone 101 picks up the voice vibration and transfer the voice vibration to electrical signal. The operational amplifier 102 amplifies the weak signal from the microphone. The analog-to-digital converter 103 converts the amplified analog signal to digital representation for further processing in the following digital signal processor block 104.

The digital signal processor 104 can operate in two different modes: the training mode and the recognition mode. A reference pattern register 105 is used for storing the final reference pattern which is the output of the digital signal processor operating in the training mode. This reference pattern is used as a reference for further recognition process. The control circuitry 106 is used to convert the serial data from the output of the analog-to-digital converter to a parallel form for input to the digital signal processor 104. The identifier 107 is used for feature extraction, end point detection, and DTW when the digital signal processor 104 operates either in the training mode or the recognition mode. The final result of recognition is shifted out by the digital signal processor 104.

Figure 2:
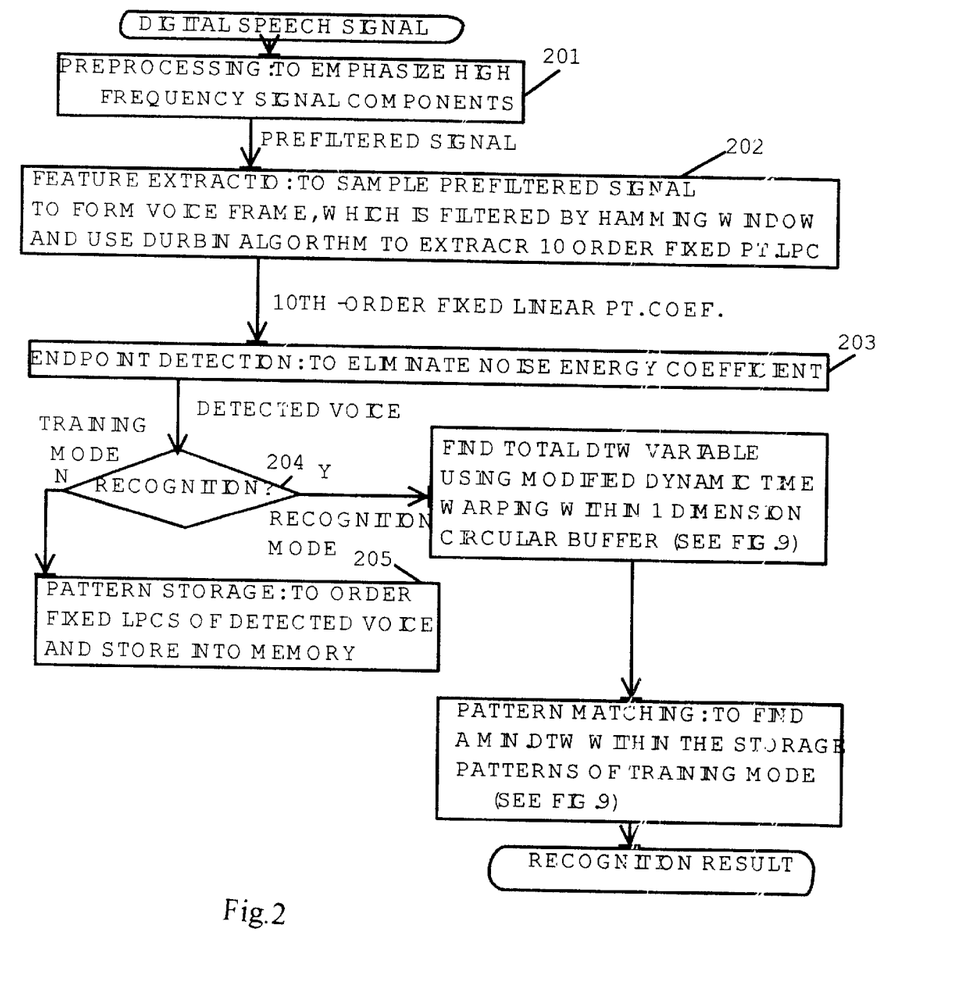
FIG. 2 illustrates the software flowchart of this stand-alone, real-time voice recognition system.
Figure 3:
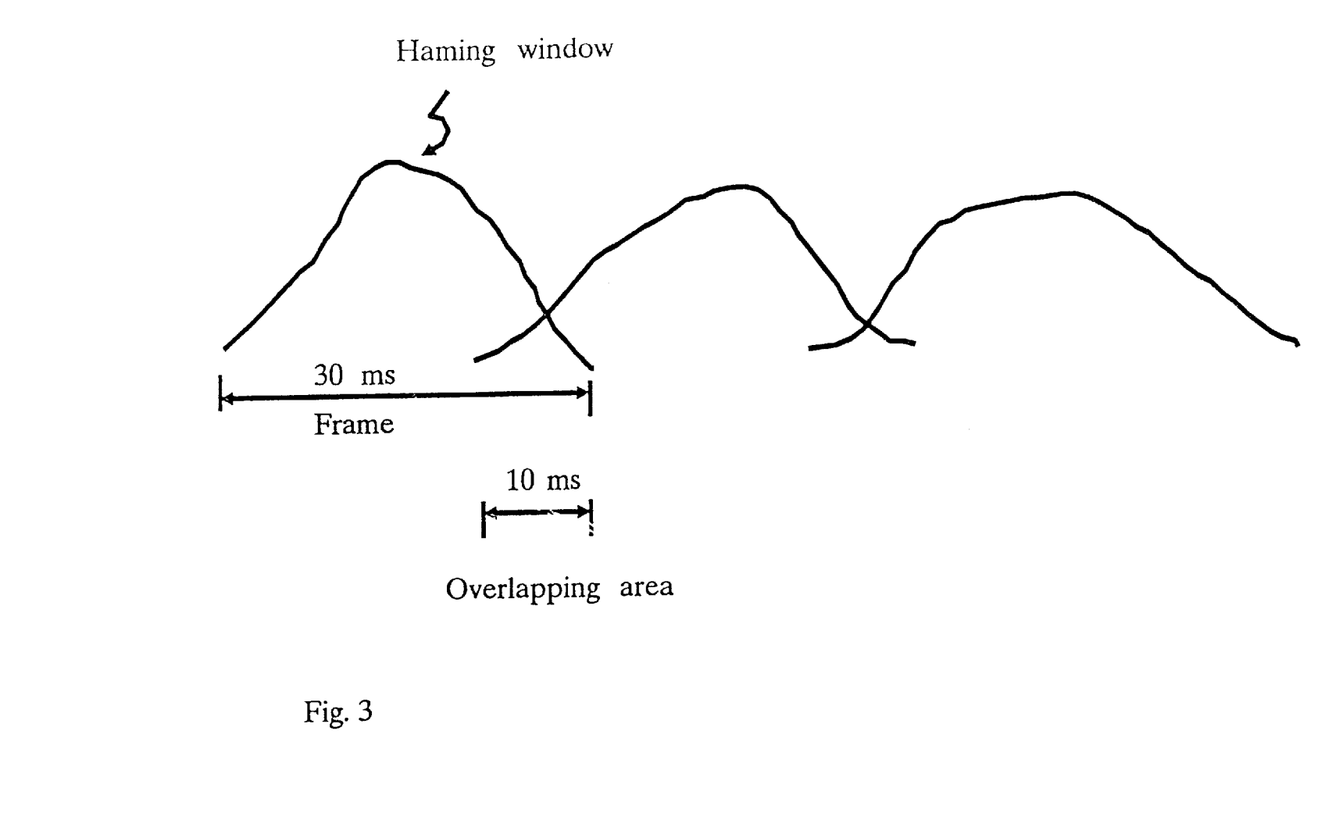
FIG. 3 illustrates the characteristic feature extraction method used in this invention.

The operation of the digital signal processor 104 depicted in the flowchart shown in FIG. 2. The parallel digital signal is prefiltered by the filter 201, which is a first order filter with a transfer function $(1-0.937Z^{-1})$. This prefilter is used to emphasize the high frequency component of the voice signal and to prevent the attenuation of the high frequency component in subsequent processing. The feature extraction step 202 samples the prefiltered signal every 30 ms with an overlap of 10 ms to form a voice frame as shown in FIG. 3. This framed signal is filtered by an approximated Hamming window function as expressed by the following equation:

$$h(n) = 0.5\{1 - \cos[2n\pi/(n-1)]\} \quad 0 <= n <= +N-1$$
$$0 \quad \text{otherwise}$$

In this step, the signal is simplified by the Durbin algorithm to obtain a 10th-order fixed point linear prediction coefficient. These coefficients are used as the reference pattern for further voice recognition.

Figure 4:
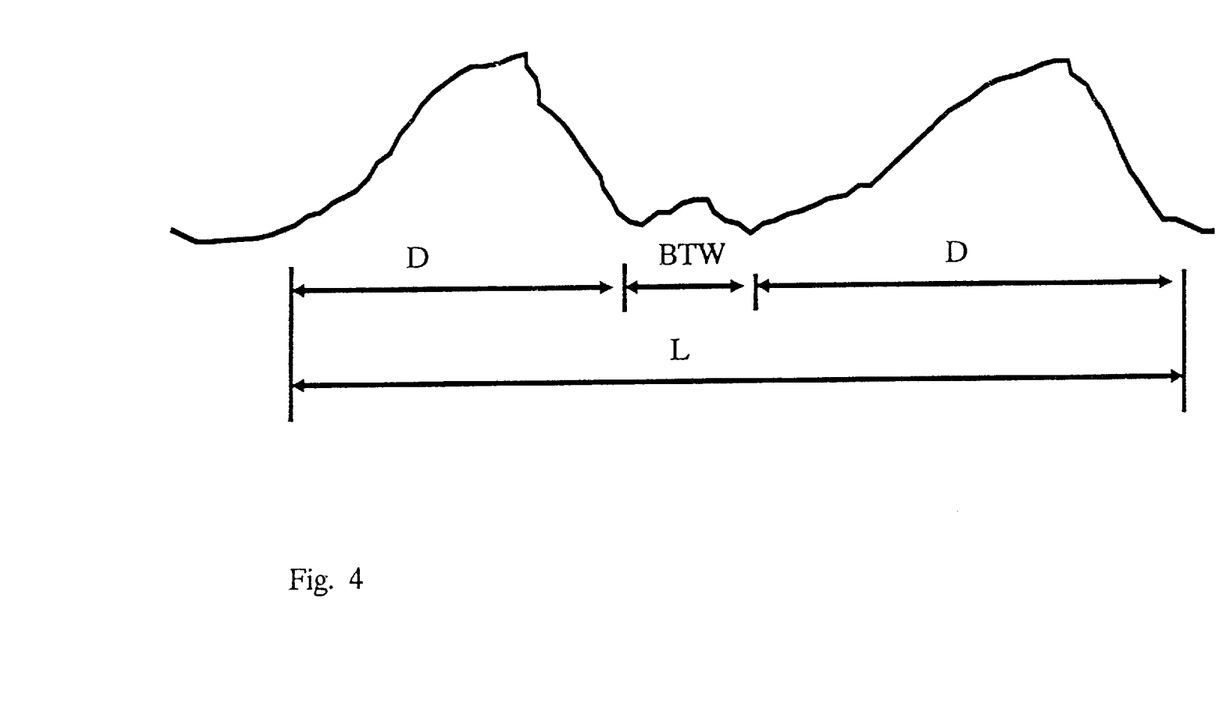
FIG. 4 illustrates the end-point detection method used in this invention.
Figure 11A:
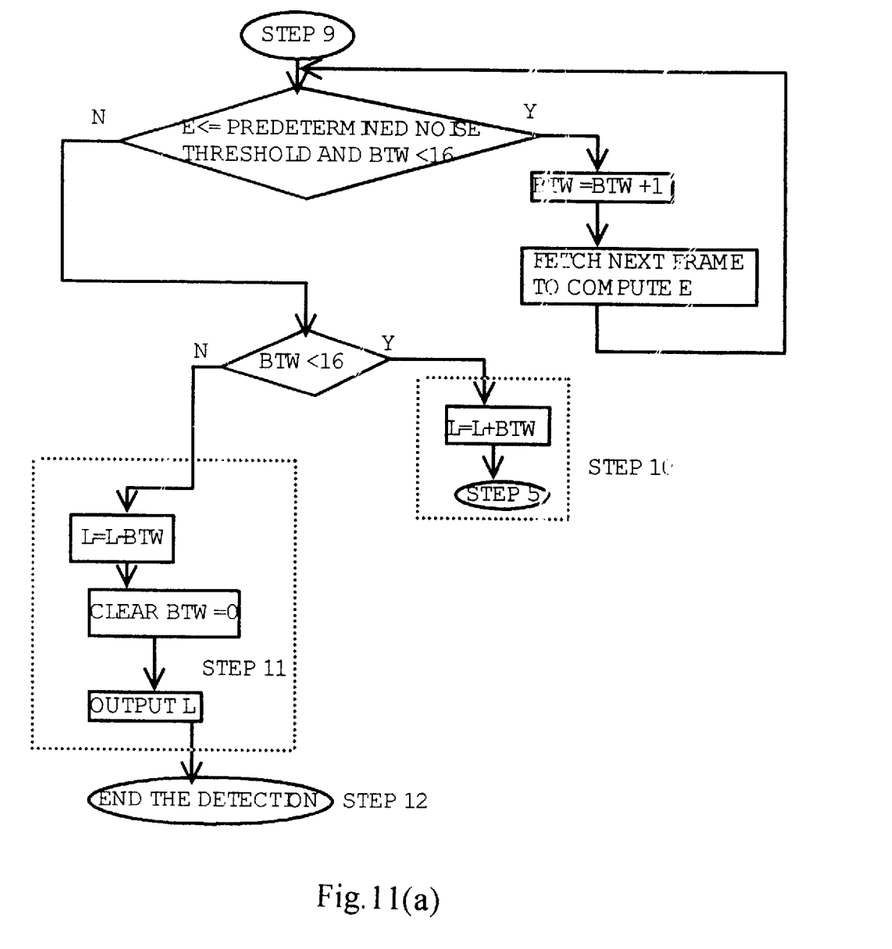
Figure 11B:
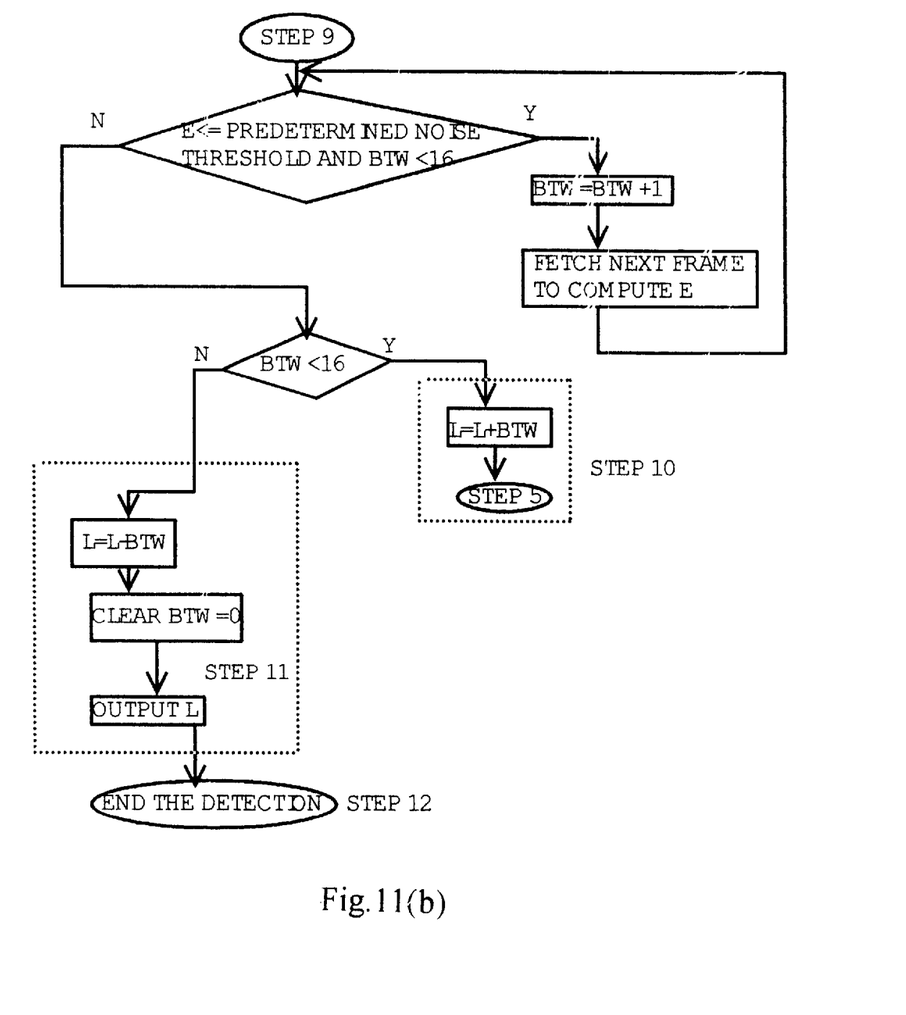

The next operation is the end-point detection. In the voice end-point detection step 203 shown in FIG. 2, the voice portion is detected and the noise portion is eliminated by using the energy coefficients. This method is illustrated in FIG. 4 where D is the width of the peak, i.e., the length of single tone, and BTW is the distance between two peaks, i.e., the space between two single tones. This operation shown in the flow-chart FIGS. 11(*a*) and 11(*b*), and is expressed as the following steps:

step 1: Find the energy coefficient E for each frame, where $$E = \sum_{i=1}^{240} [S(i)]^2, \, S(i) \text{ is the amplitude of the sampled voice signal;}$$

step 2: Define the length L of voice be 0 and take one energy coefficient E;

step 3: If E<threshold, the corresponding frame is only noise, take energy coefficient E of next frame, and test its value until E>=threshold;

step 4: Set flag=0 to indicate that this is a single tone;

step 5: Set D=0;

step 6: If D>threshold, increase D by 1, and take the next frame until D<=threshold;

step 7: Let L=L+D;

step 8: If flag=0 and D<8, then this frame is only noise, let L=0 and go to step 1;
   If flag=0 and D<8, then BTW=0, go to step 9;
   If flag=1 and D<8, then BTW=BTW+D;
     If flag=1 and D<=8, then BYW=0;

step 9: If E<threshold and BTW<16, then BTW+BTW+1, take the next frame, and go to step 9;

step 10: If BTW<16, then L=L+BTW. Go to step 5;

step 11: L=L−BTW; clear BTW and output voice length L;

step 12: Stop.

Figure 5:
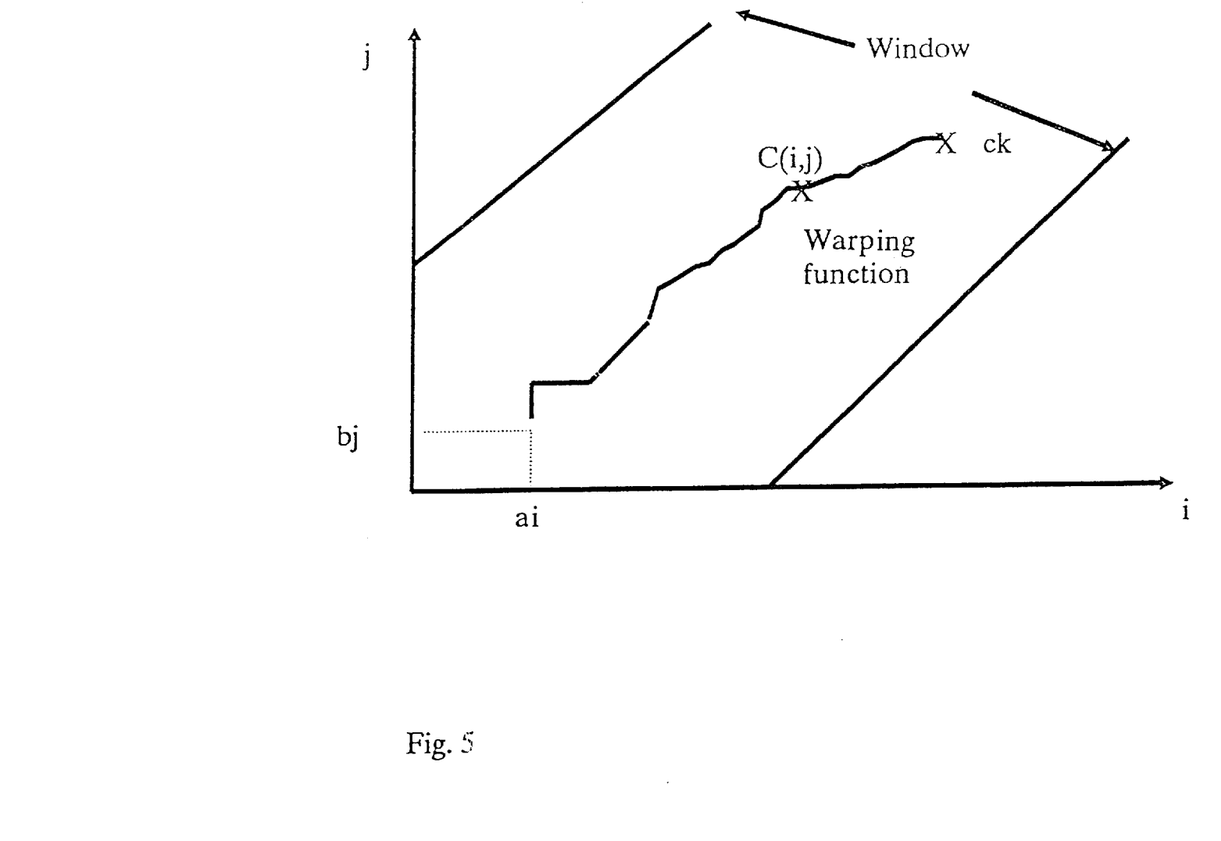
FIG. 5 illustrates a traditional dynamic time warping method.
Figure 6:
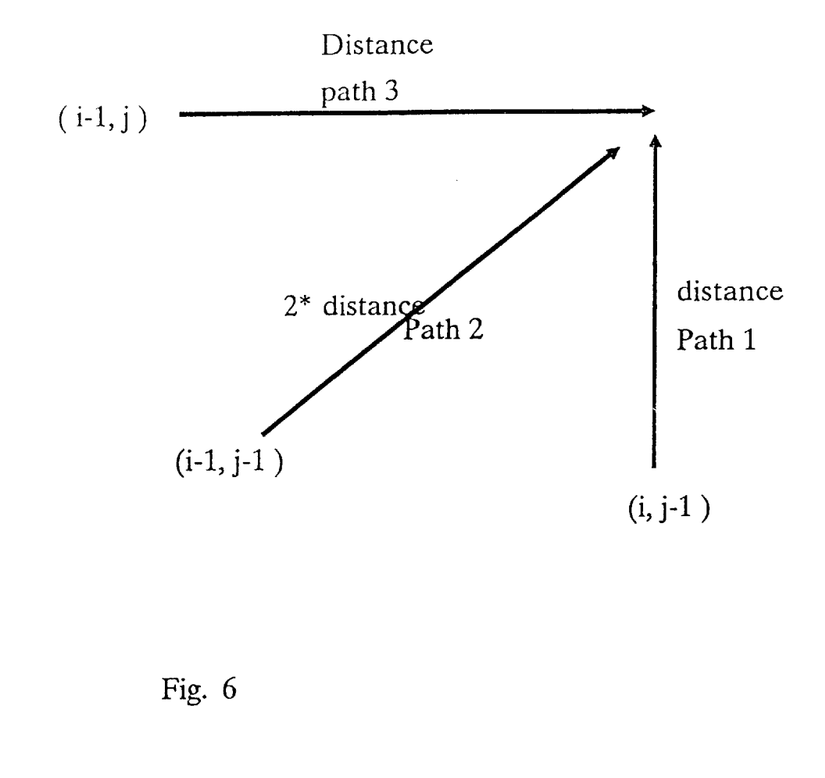
FIG. 6 illustrates a symmetric form of this invention.
Figure 7:
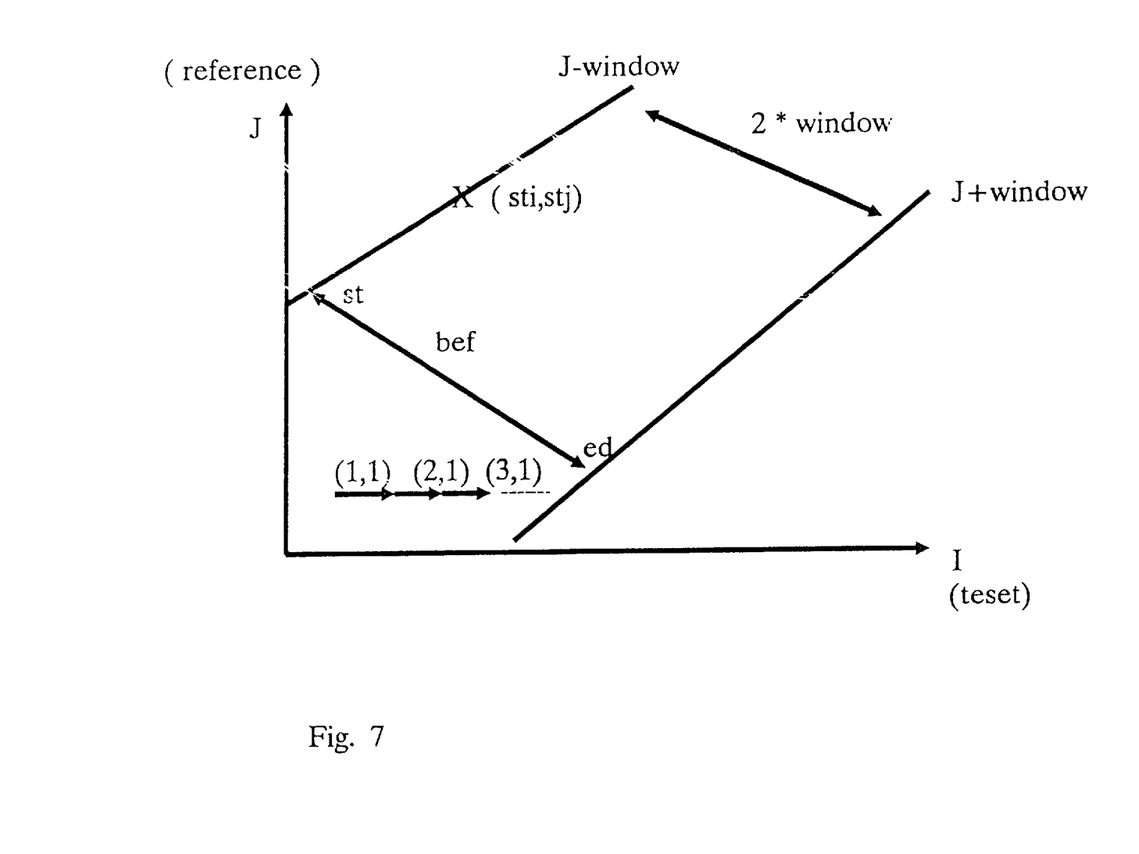
FIG. 7 illustrates the dynamic time warping method used in this invention.
Figure 8:
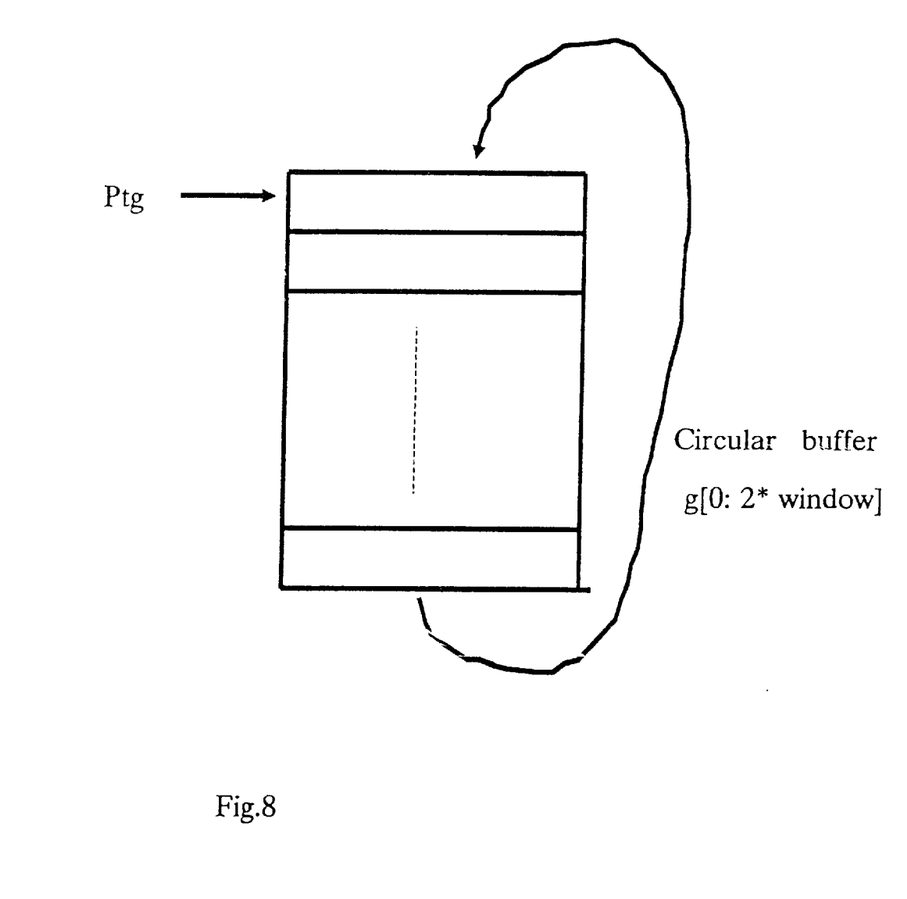
FIG. 8 illustrates the one-dimension cyclic buffer used in this invention.

A dynamic time warping method is used for the recognition operation 204 in FIG. 2. The traditional time warping method is illustrated in FIG. 5. The time warping method used in this invention is modified by a symmetric form as shown in FIG. 6. The traditional dynamic time warping method uses two-dimension warping function to recognize voice. As shown in FIG. 5, it is well recognized that the warping space is i*j. If i and j are large, the memory size for warping space is excessively large. In this invention, the two-dimension function is changed to a one-dimension function for the conservation of memory. The warping space is only 2W+1, where W is the adjust window size. The experiment value of the adjust window size is 6 in this invention. In order to prevent a long search distance and overflow of this overflow function, a circular buffer is used as illustrated in FIG. 8. To explain this modified dynamic time warping method more clearly, the following varaibles are defined:

ii is the length of the testing pattern.

jj is the length of the reference pattern.

st is the starting point of the searching range for the testing pattern.

ed is the ending point of the searching range for the testing pattern.

bef is the searching length (i.e., ed−st+1).

sti is the x-axis value of the starting point of the previous search.

stj is the y-axis value of the starting point of the previous search.

ptr is the searching length.

W is the window size.

ptg is the pointer of the circular buffer.

DTW is the total length.

ai is the linear prediction coefficients of the testing pattern.

bj is the linear prediction coefficients of the reference pattern.

g is the size of the circular buffer (i.e., 2W+1).

d(i,j) is the minimum distance.

Figure 9:
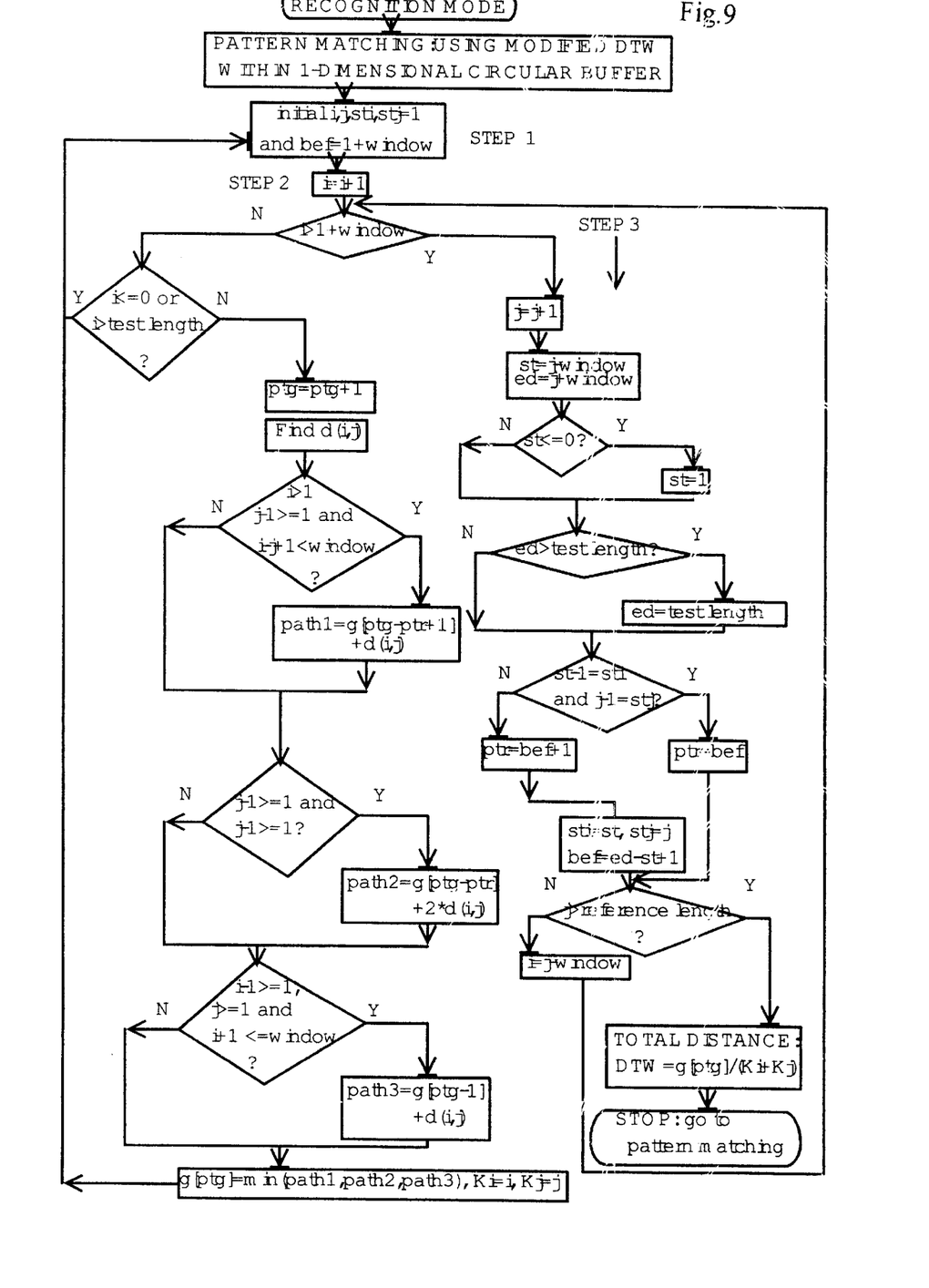
FIG. 9 shows the flowchart for implementing the operation of this invention.

The operation, as shown by the flow-chart in FIG. 9, is as follows:

step 1:Set i,j, sti,stj, ptg be 1. Set bef=1+Window;

step 2: Set i=i+1;

step 3: If j=j+1 (i>j+Window);
  then
    calculate st=j−Window and ed=j+Window;
    If st<=0, then st=1;
    If ed>ii, then ed=ii;
    If (x−1,y−1)=(sti,stj), then ptr=bef;
      else ptr=bef+1; sti=st, stj=j, bef=ed−st+1;
    If j>jj, then DTW=g(p+g)/(ki+kj); else i=j−Window;
    go to step 3;
  else
    If i<=0, go to step 2;
    If i>ii, go to step 2;
    ptg=ptg+1;

$$d(i,j) = \sum_{m=1}^{10} |ami - bmj|;$$

If i>1 and j−1>=1 and |i−j−1|<=Window,
  then path1=g[ptg−ptr+1]+d(i,j);
  If i−1>=1 and j−1=1, then path2=g[ptg−ptr]+2*d(i, j);
  If i−1>=1 and j>=1 and |i−j−1|<=Window,
  then path3=g[ptg−1]+d(i,j);
  g[ptg]=minimum(path1,path2,path3), ki=i, kj=j;
  go to step 2.

Figure 10:
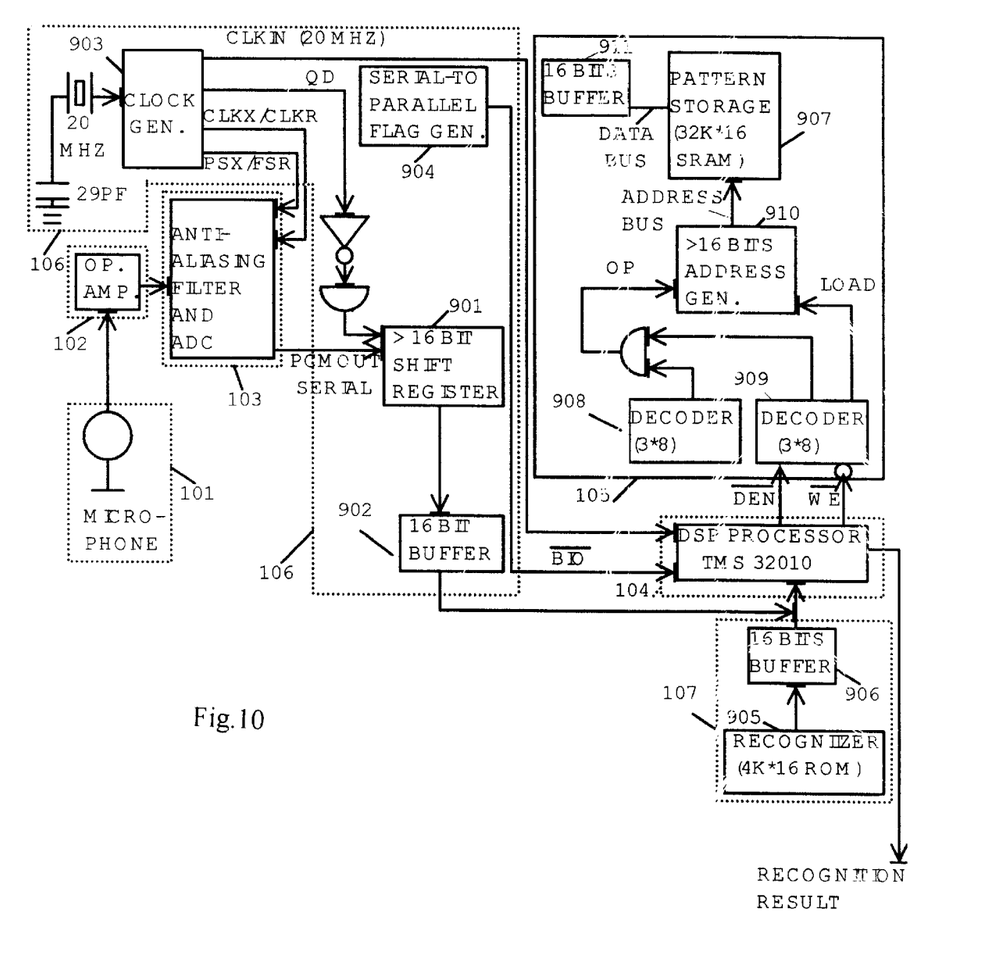
FIG. 10 illustrates the optimal realization of this invention.

The optimal realization of this invention is illustrated in FIG. 10. The input voice vibration is converted into an electrical signal by microphone 101, and then amplified by the amplifier 102 as an analog signal with a range of +5V to −5V. This analog signal is then converted into serial digital data by the analog-to-digital converter 103. This serial digital data (PCMOUT) is a collection of 8-bit PCM code of each sampled signal. This serial data is transformed into parallel form through the shift register 901 for further processing of the digital signal processor 104.

Consider next the clock timing for sampling. The clock generator 903 generates the clocks for the purpose of (1) supplying the master clock of 20 MHz for the digital signal processor 104, (2) supplying the CLCK/CLKR clock of 2 MHz and FSX/FSR clock of 8 KHz for the A/D converter, and (3) generating a clock Qd which is transferred to the serial-to-parallel flag generator 904.

After the 16-bit shift register 901 receives two 8-bit Log-PCM digital data, the serial-to-parallel flag generator 904 generates a BID signal which is transferred to the digital signal processor. Upon the activation of the BID signal, the digital signal processor accepts the 16-bit parallel digital data which are transferred from the 16-bit shift register 901 and the 16-bit buffer 902. These digital data are prefiltered by the first order filter $(1-0.937Z^{-1})$ which is accomplished by the digital processor 104. The identifier (4K*16 ROM) 905, and a 16-bit buffer 906. The filtered signal is then analyzed in the feature extraction step 202 to generate the 10th-order fixed point prediction coefficients every 30 ms with 10 ms overlap. The coefficients are the recognition reference for the end-point detector 203. In the training mode, these coefficients are stored in the reference storage (32K*16 SRAM) 907 the data bus of which is fed to a 16-bit buffer 911. In the recognition mode, two decoders 908 and 909 generate the drive signal CP and then transfer the signal CP to the 16-bit address counter 910. The counter 910 then generates the address data for reference pattern storage 907. The reference pattern which is addressed by the address data from counter 910 is read out and sent to the 16-bit buffer. By using the dynamic time warping method, which is modified by a symmetric form in the the identifier 905, the digital signal processor 104 then outputs the result of the recognization.

What is claimed is:

1. A method of recognizing voice in real time by converting a sampled voice signal, having voice portions and noise portions, in digital form to a reference pattern in a training mode and outputting recognition results in recognition mode, comprising the steps of:

preprocessing by prefiltering said sampled voice signal through a first order filter to emphasize the high frequency components of the sampled voice signal in digital form and to obtain a prefiltered signal:

feature extraction by framing said prefiltered signal to produce a framed signal, filtering said frame signal by a Hamming window function and by a Durbin algorithm to result in multi-order fixed point linear prediction coefficients;

voice end-point detection by computing said voice portions and eliminating said noise portions using the following steps:

step 1: define a length L of time of said voice to be zero, step 2: fetch one frame to compute the energy coefficients E, where $$E = \sum_{i=1}^{240} [Si(i)]^2, \text{ and}$$

S(i) is the amplitude of said sampled voice signal, step 3: test whether E>=a predetermined noise threshold, if "no", go to step 2, step 4: set Flag=0 where Flag is a Boolean variable to indicate that the sampled voice signal is a single tone, step 5: set a width D, the length of a single tone of said voice, D=0, step 6: increase D by 1 and fetch next frame to compute the energy coefficient E, and if E>=the predetermined noise threshold, stay at step 6 until E<the predetermined noise threshold, step 7: let L=L+D, step 8: if Flag=0, as set in step 4 and D<8, go to step 1, if Flag=0 and D>=8, then BTW=0, where BTW is a distance between one said single tone and another said single tone, Flag=1, go to step 9, if Flag=1 and D<8, then BTW=BTW+D, go to step 9, if Flag=1 and D>=8, then BTW=0, go to step 9, step 9: if E<the predetermined noise threshold and BTW<16, then BTW=BTW+1, and fetch next frame to compute E, and go to step 9, step 10: if BTW<16, set L=L+BTW and go to step 5, step 11: set L=L−BTW, clear BTW and output L, step 12: end said end-point detection;

in said training mode, storing said multi-order fixed point linear prediction coefficients as a reference pattern in a memory, and going back to said preprocessing step;

in said recognition mode, storing said multi-order coefficients by a dynamic time warping method in a modified symmetric form, comparing updated said coefficients with said reference pattern obtained previously during said training mode, and outputting result;

said modified symmetric form using a one-dimensional circular buffer with only 2*n+1 space in said memory instead of n*n space for a 2-dimensional memory, where n is the adjustable size of said dynamic time warping window and is adjustable.

2. A method as described in claim 1, wherein said voice signal is sampled every 30 ms with 10 ms overlap.

3. A method as described in claim 1, wherein said multi-order fixed point linear prediction coefficients are 10-th order fixed linear prediction coefficients.

* * * * *